July 9, 1963

B. R. BENITH 3,096,802

BREAD SLICING MACHINE

Filed June 7, 1960

INVENTOR.
BENEDICT R. BENITH

BY *Bradley Cohn*

ATTORNEY

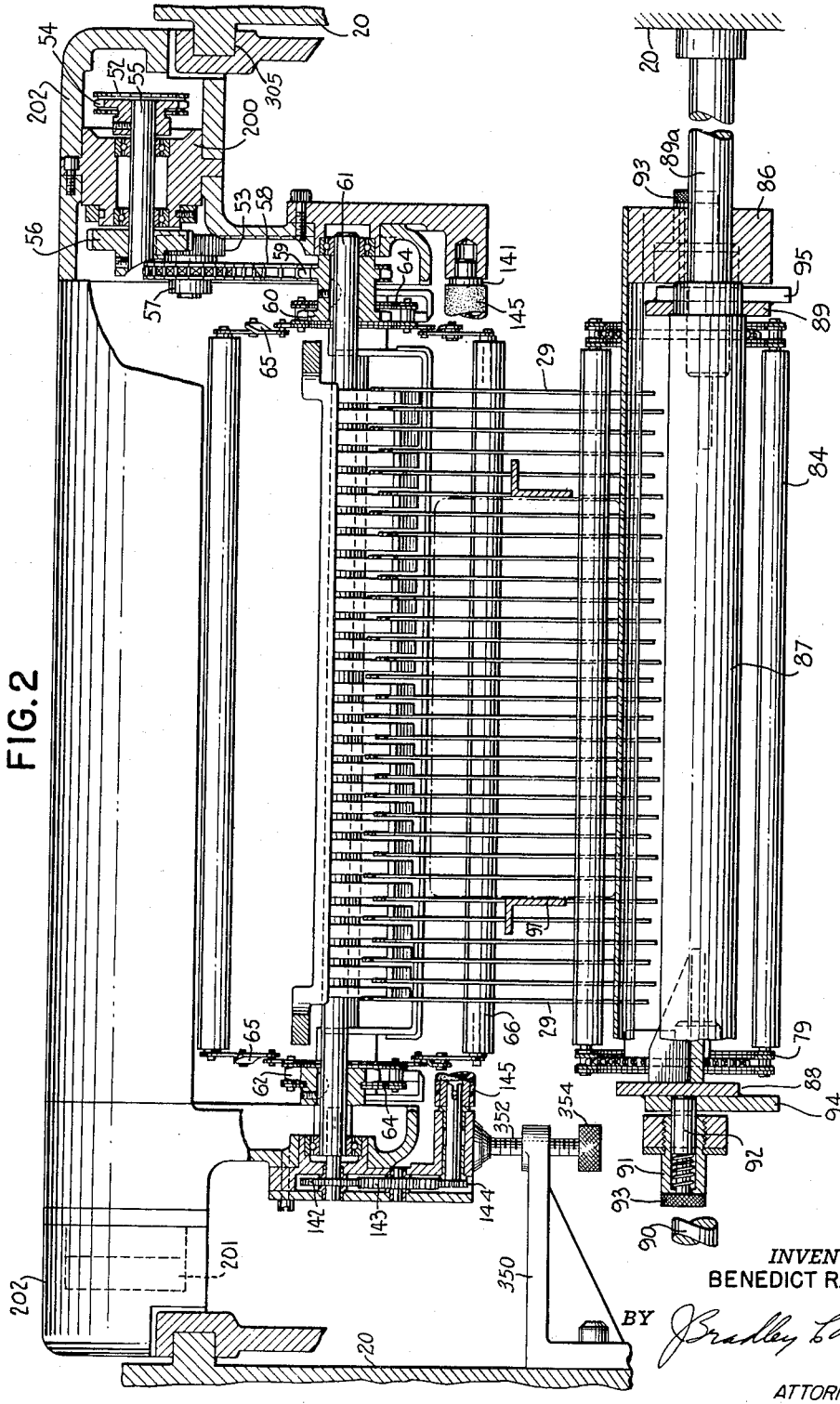

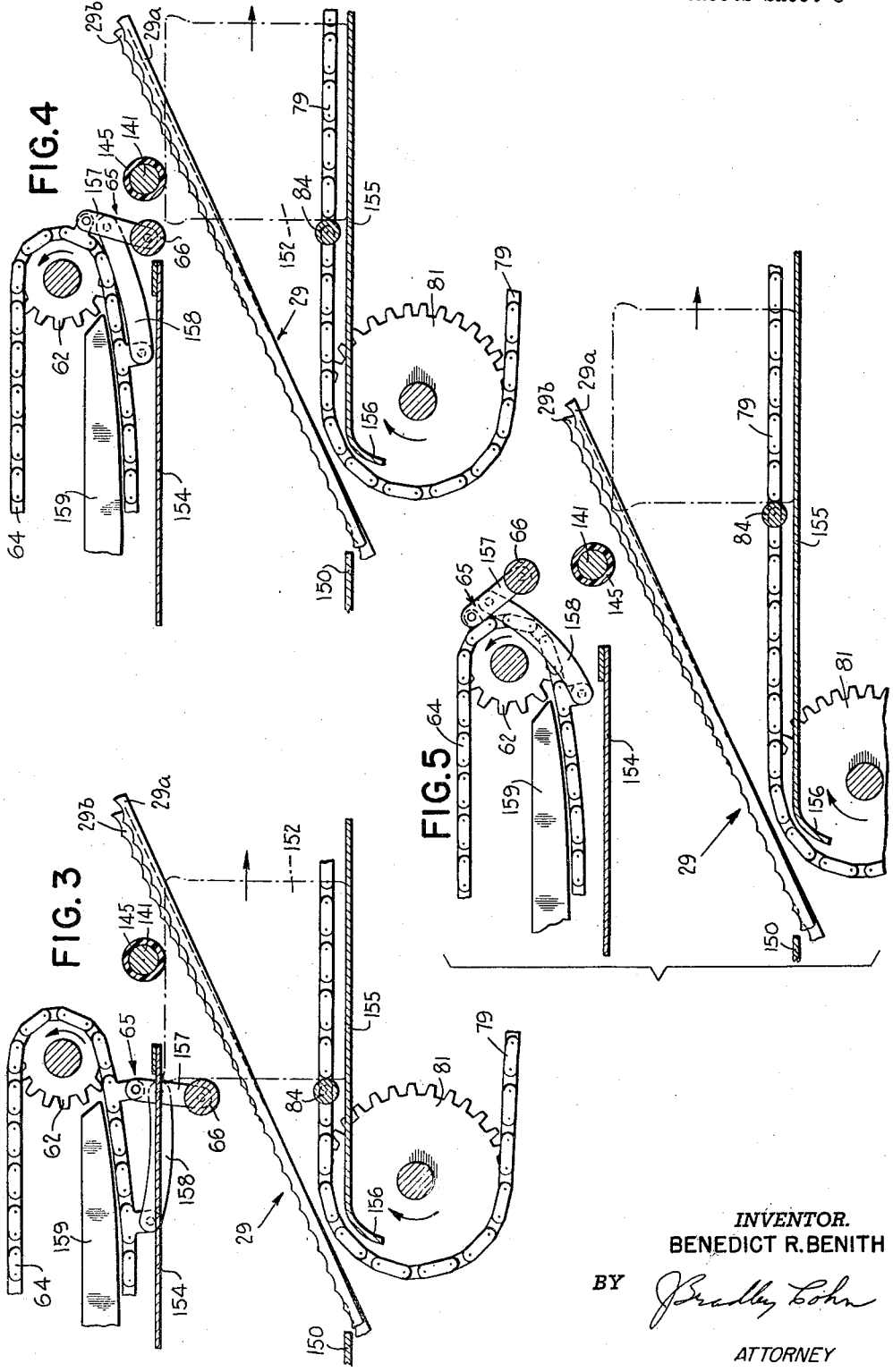

July 9, 1963

B. R. BENITH 3,096,802

BREAD SLICING MACHINE

Filed June 7, 1960

INVENTOR.
BENEDICT R. BENITH

BY

ATTORNEY

July 9, 1963　　　　　B. R. BENITH　　　　3,096,802
BREAD SLICING MACHINE

Filed June 7, 1960　　　　　　　　　　5 Sheets-Sheet 5

INVENTOR.
BENEDICT R. BENITH

BY

ATTORNEY

United States Patent Office 3,096,802
Patented July 9, 1963

3,096,802
BREAD SLICING MACHINE
Benedict R. Benith, Westbury, N.Y., assignor to American Machine & Foundry Company, a corporation of New Jersey
Filed June 7, 1960, Ser. No. 34,561
9 Claims. (Cl. 146—88)

This invention relates, in general, to slicing machines, and, more particularly, to high speed bread slicing machines using endless bandsaw blades.

An object of this invention is to provide a bread slicing machine which allows loaves of bread to pass through the slicing machine at a higher rate.

Another object of this invention is to provide a bread slicing machine having a mechanism which maintains a definite relationship between the position of pusher flights on two conveyors as one conveyor is moved in an angular direction.

A further object of this invention is to provide a bread slicing machine having blades inclined at an angle to the paths of loaves of bread passing beneath a top infeed conveyor which is adjustable and moves in an angular direction parallel to the slicing blades to provide for loaf height adjustment.

A still further object of this invention is to provide a bread slicing machine having a top infeed conveyor which may be swung out of the way to facilitate cleaning the machine.

Yet another object of this invention is to provide a bread slicing machine having an infeed conveyor which individually urges each loaf of bread partially through the blades of the machine, a discharge conveyor which individually urges each loaf the rest of the way through the blades and along a delivery table, and a variable speed drive for the discharge conveyor so that both conveyors will urge each loaf at substantially the same rate of speed through the blades but the discharge conveyor will then urge each loaf with a higher average overall velocity along the delivery table.

Many other objects, advantages and features of this invention reside in the construction, combination and arrangement of parts involved in the embodiment of the invention as will be understood from the following description and accompanying drawings wherein:

FIG. 2 is a section taken on the line 2—2 of FIG. 1;

FIGS. 3, 4 and 5 are vertical longitudinal sections through fragments of the bread slicing machine showing a loaf, drawn in broken lines, being urged past the blades;

Figure 1:
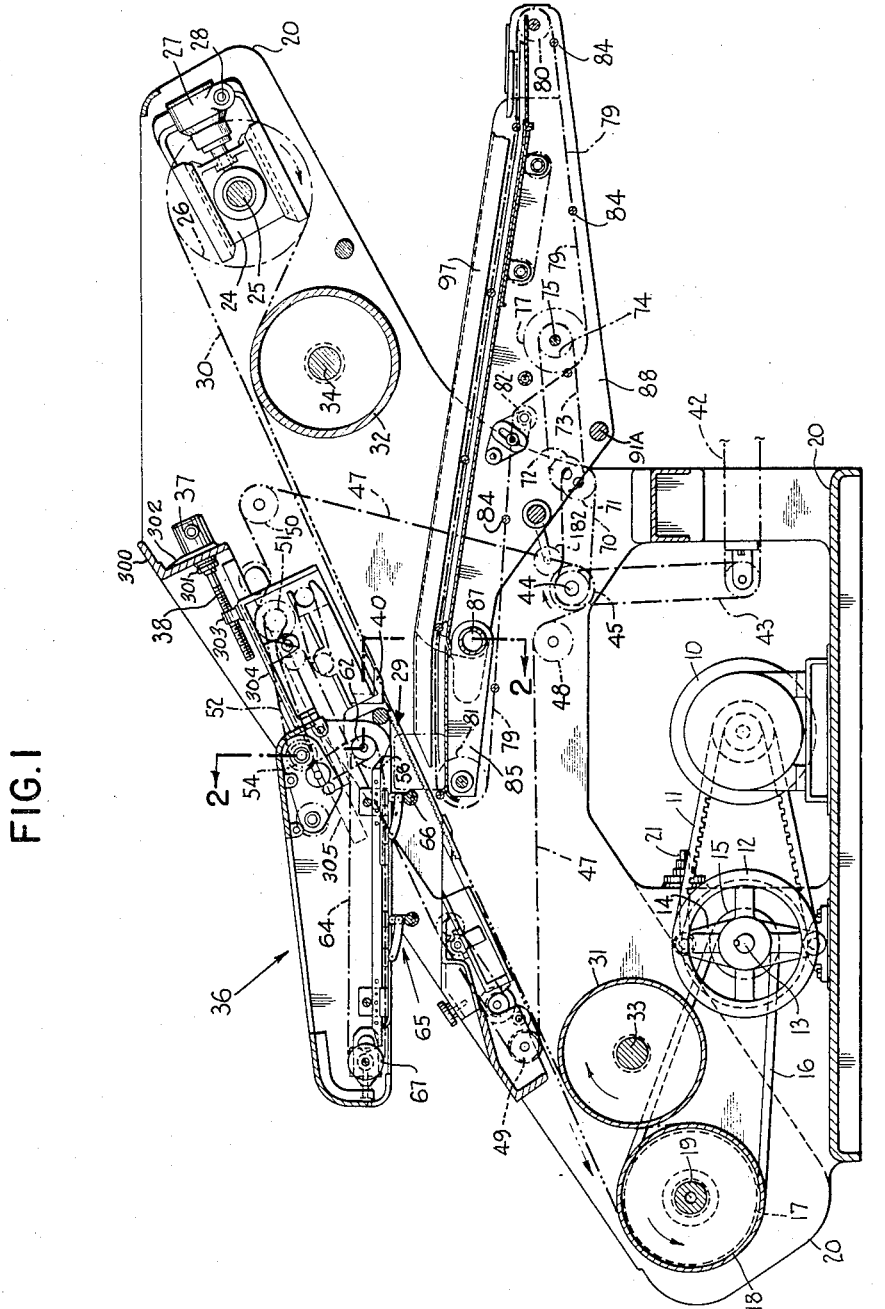
FIG. 1 is a vertical section taken longitudinally through the bread slicing machine with the paths of the blades, the flight supporting chains, and the drive chains shown in broken lines.

Referring to the drawings in detail, the bread slicing machine is constructed as follows. As shown in FIG. 1, a motor 10 drives the belt 11 which turns the pulley 12 mounted on shaft 13. Shaft 13 is rotatably mounted in the element 14 which is pivotally connected by its lower end to the frame 20 of the bread slicing machine. Shaft 13 also carries pulley 15 which drives the belt 16 which, in turn, drives the pulley 17 mounted on shaft 19. Shaft 19 is rotatably journaled in the sides of the frame 20 and has mounted upon it the drive drum 18. Rod 21 has one end attached to the top of element 14 while the other end is adjustably secured to the frame 20 so that rod 21 may be adjusted to pivot element 14 about its lower end to properly regulate the tension in belt 16. The motor 10 may be moved relative to the frame 20 to adjust the tension of belt 11.

On each side of the top of frame 20 there is slidably mounted a bearing block 24 in which a shaft 25 is rotatably mounted to carry the blade support drum 26. Two retracting mechanisms 27 are connected by means of a shaft 28 which may be turned to slide both the blocks 24 in relation to the frame 20 to move the drum 26 away from the drum 18 and thus adjust the tension of the saw blades 29 whose paths are indicated by the broken lines 30. The two deflecting idler drums 31 and 32 are rotatably secured by means of the shafts 33 and 34. The blades 29 each form a distorted figure 8 passing under the drive drum 18 and over the deflecting roller 31 to pass over, around, and down under the support roller 26 to pass over the deflecting roller 32 and then extend back to the top of the drive roller 18. Since the blades 29 must lie flat against the drums when they contact them, each blade receives a 180 degree twist between drum 31 and drum 26 as well as between drum 32 and drum 18. Therefore, as seen in FIG. 1, if the teeth of blade 29 were disposed towards the viewer as it passed about drum 18 and drum 31, the teeth of blade 29 would be disposed away from the viewer as the blade passed about drum 32 and drum 26.

Figure 6:
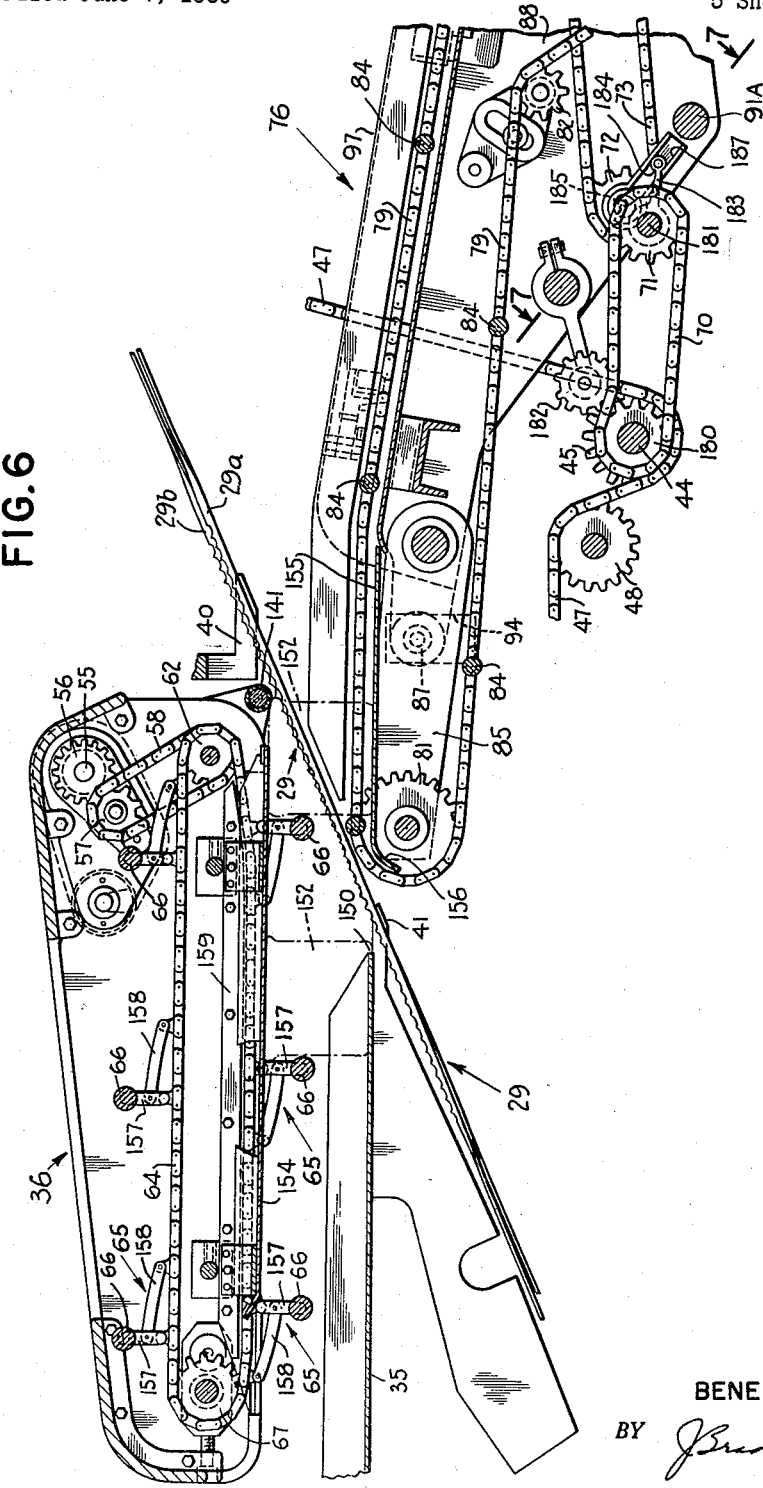
FIG. 6 is a vertical section taken longitudinally through the infeed head and fragments of the infeed table and the delivery table of the slicing machine.
Figure 7:
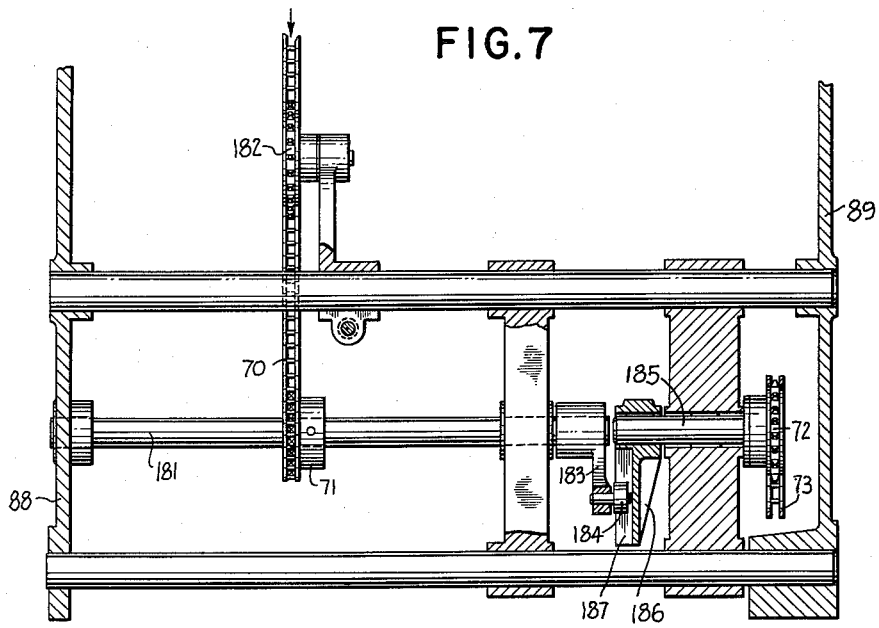
FIG. 7 is a section taken on line 7—7 of FIG. 6.

An infeed head, generally designated by the numeral 36, may be seen in FIG. 1 and in greater detail in FIG. 6. It is slidably mounted between the side members of the frame 20 to be positioned by means of the handle 37 and the screw thread 38 a desired distance above an infeed table 35 to accommodate loaves of bread of a given height. The upper blade guides 40 and the lower blade guides 41 are mounted between the frame members 20. These blade guides 40 and 41 may be laterally adjusted to regulate the width of the slices. Such adjustable blade guides may be of the type shown in Patent No. 2,293,083, issued August 18, 1942, to P. G. Schlemmer or Patent 2,375,231, issued May 8, 1945, to A. A. Kottman. A main drive chain 42 extends from the bread wrapping machine (not shown) to drive the chain 43 which turns the shaft 44 clockwise. Shaft 44 carries sprocket 45 which drives the endless chain 47. Chain 47 extends about the sprockets 45, 48, 49 and 50 and engages the sprocket 51 mounted on the infeed head.

Referring in addition to FIG. 2, the endless chain 47 drives the sprocket 51 which, with suitable sprockets and chain 52, drives sprocket 54 mounted on shaft 55 which thereby drives gear 56. Gear 56 drives gear 53 which has mounted on it sprocket 57 driving chain 58 and thereby sprocket 59. Sprocket 59 is formed integrally with sprocket 60 and is mounted on the shaft 61 which carries sprocket 62 on its other end. Therefore, it may be seen that the main drive of the machine from the bread wrapper (not shown) drives the sprockets 60 and 62 mounted on the shaft 61 which is journaled in the infeed head 36. Referring further to FIG. 1 and FIG. 6, the sprockets 60 and 62 drive the chains 64 about the two sprockets 67 located at the other end of the infeed head 36. The two chains 64 carry the brackets 65 which support the flights 66.

Figure 8:
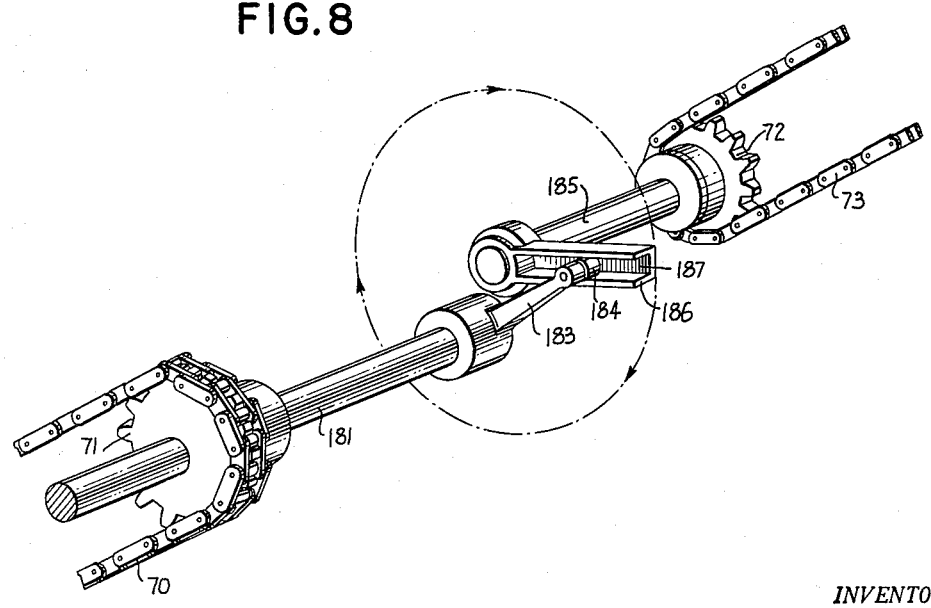
FIG. 8 is a perspective view of the variable speed drive.

As shown in FIGS. 1, 6, 7 and 8, shaft 44 also carries sprocket 180 which drives sprocket 71 mounted on shaft 181 by means of chain 70. Sprocket 182 is adjustably positioned against chain 70 to maintain tension in it. Shaft 181 carries at its end the arm 183 with the drive roller 184 disposed at its end. Shaft 185, which carries sprocket 72, is journaled parallel to, but slightly out of line with, shaft 181. Shaft 185 carries at its end the driven arm 186 containing the channel 187 in which the drive roller 184 extends. Referring now only to FIG. 8, if shaft 181 is rotated at a constant speed, it will drive shaft 185 by means of the arms 183 and 186. When arm 183 is extending upward, it will drive shaft 185 at a higher speed than when arm 183 is extending downward. Thus, as shaft 181 turns at a constant speed, it drives shaft 185 at a higher speed for one part of each revolution and at a lower speed for the other part of each revolution.

Referring again to FIGS. 1 and 6, sprocket 72 drives chain 73 and thereby sprocket 74. Sprocket 74 is mounted on shaft 75 which carries the two large sprockets 77. These sprockets 77 are disposed on each side of the delivery table, generally designated by the numeral 76, and they each drive an endless chain 79. Each chain 79 extends about the sprockets 80 and 81 and the sprockets 82 which may be positioned to adjust tension in the chains 79. The flights 84 are carried by the chains 79 over the top surfaces of the delivery table 76. The flights 84 extend beneath and between a pair of parallel load end guides 97.

The forwardly disposed portion of the delivery table of the slicing machine has two side plates 85 and 86 which support the sprockets 81. These side plates 85 and 86 are hinged about the axis of the tubular member 87. As shown in FIG. 2, two shafts 89a and 90 are fixed in the main frame 20 of the slicing machine and extend into the tubular member 87. The sides of the delivery table, 88 and 89, are fixed to the ends of tubular member 87 so that the shafts 89a and 90 with the tubular member 87 form one main support for the entire delivery table 76 between the main frames 20. Referring to FIG. 1, a second main support for the delivery table 76 is provided by the rod 91A. As shown in FIG. 2, the side member 86 is pivotally secured about shaft 89a. Shaft 90 has the side member 85 pivotally secured about it, but the side member 85 is shown removed and the tubular member 87, the side member 88 and shaft 90 are further broken away in section to show a locking plunger assembly 91. Each locking plunger assembly 91 consists of a spring loaded plunger 92 which is fixed to a side plate 85 or 86. Each plunger 92 may be withdrawn by means of a knurled end portion 93 from engagement with an aperture in a small side plate 94 or 95 which is fixed to the side plates 88 or 89 of the delivery table 76. Therefore, as seen in FIG. 1 or FIG. 6, the withdrawal of the plungers 92 allows the forwardly disposed portion of a delivery table 76 to swing downward to facilitate the cleaning and servicing of the slicing machine.

Referring now to FIG. 2, a top hold down roller 141 is rotatably journaled in the infeed head 36. Shaft 61, which drives the chains 64 by means of the sprockets 60 and 62, has a small extension which carries and rotates the spur gear 142. Gear 142 meshes with and drives gear 143 which, in turn, meshes with and drives the pinion gear 144 which is secured to an extension of roller 141 and drives it. Roller 141 is covered with a suitable surface 145 to engage the top of a loaf of bread.

Referring now to FIGS. 3, 4, 5 and 6, this invention operates as follows. An infeed table 35 is positioned at substantially the same height as the forwardly disposed end of delivery table 76. The infeed table delivers loaves of bread under the infeed head so that a single loaf is engaged and urged along the top surface of the infeed table by each flight 66.

As each loaf, generally designated by the numeral 152 and shown in dotted lines, is urged over the end 150 of the infeed table by a flight 66, its top slidably contacts the loaf guide top plate 154 below which the flights 66 pass. The blade guides 41 extend between and through the blades 29 and may support the bottom of a loaf to some extent as it passes through the blades.

As shown in FIG. 3, each flight 66 urges a loaf of bread from the infeed delivery table end 150 onto delivery table 76. The front portion of delivery table 76, which folds downward in a manner which has been described, has extending between the side plates 85 and 86 a thin bottom plate 155 with a downwardly curving leading edge 156. Each flight 66 urges a loaf 152 onto this plate 155. As the loaf moves onto plate 155 out from under the top plate 154, it is held down by the rotating hold down roller 141.

Each flight 66 is rotatably secured at each end by a bracket 65 comprising an arm 157 which is pivotally attached to the chain 64 and a retracting link 158 is pivotally attached between a portion of chain 64 disposed behind arm 157 and a central portion of arm 157. Since each chain 64 rides on the underside of a guide track 159 which curves slightly upward at its forwardly disposed end, as each chain 64 moves upward along guide track 159 and then curves about each sprocket 62, the flight support arms 157 will be retracted as each arm 157 moves upward along track 159 and then upward about sprocket 62. This retraction, which is shown successively in FIGS. 3, 4 and 5, enables the flights 66 to pass between top plate 154 and roller 141 and allows the entire infeed head 36 to be located closer to the blades 29. As each loaf 152 is urged past the blades 29 by a flight 66, the chains 79 carry a flight 84 into contact with the lower sliced portion of the loaf 152. As shown in FIGS. 4 and 5, flight 84 urges the loaf 152 on through the blades as flight 66 retracts upward between plate 154 and roller 141.

Since loaves of bread may vary considerably in their height, the infeed head 36 must be moved parallel to the blades 29 to bring the top plate 154 and the roller 141 into contact with the leaves to hold them down while they are being sliced. Referring to FIG. 1, shaft 44 drives chain 79 in the manner that has been described. Shaft 44 also drives chain 47. Therefore, when a flight 84 which is mounted on chain 79 is about to contact a loaf as shown in FIG. 1, a flight 66 must have urged a loaf into the position shown. Since a sprocket 51 on the infeed head 36 contacts a portion of the drive chain 47 disposed parallel to the direction of movement of head 36 when it is being adjusted for loaf height, this movement of the infeed head 36 by means of handle 37 will cause chain 47 to rotate sprocket 51 relative to it.

Angle iron cross bar 300 is secured between the opposed side members of frame 20. Screw thread element 38 is provided with a collar 301 which abuts the left-hand surface of bar 300, as seen in FIG. 1, and handle 37 having a flange 302 is secured to element 38 on the right-hand surface of bar 300. Screw thread 38 engages in a nut 303 affixed to the upper surface of housing 304 near its front end. As handle 37 and screw 38 are turned, in one direction or the other, infeed head 36 slides upwardly to the right or downwardly to the left and parallel to blades 29. The infeed head moves in guide blocks 305 formed in the opposed side members of frame 20. The blades 29, screw 38 and the opposed guide blocks 305 are in parallel alignment so as to maintain a constant angular relationship which will translate the distance of the movement of sprocket 51 along chains 47 into a proper displacement of chains 64 and flights 66.

If the blades 29 form an angle of 24½ degrees with the path of the bread under the infeed head, a 2.1 inch height adjustment of infeed head 36 would move it diagonally upward 5 inches. However, the horizontal component of this diagonal motion would only be 4.5 inches. Assuming that the relative proportions of the drive elements were such that chains 79 and chains 64 were moving at the same velocity when in the position shown in FIG. 1, the relative velocity of chain 64 to chain 47 should be equal to the cosine of 24½ degrees. Then a 2.1 inch height adjustment of infeed head 36 would move it obliquely upward 5 inches and would move 5 inches of chain 47 past sprocket 51. Five inches of chain 47 moving past sprocket 51 would then move the chains 64 4.5 inches to the left and this would exactly equal the distance the infeed head 36 would move to the right in making such a 2.1 inch height adjustment. Although I have used the angle of 24½ degrees as an example, the infeed head 36 may be adjusted obliquely at any angle and still achieve the results of this invention if the relation of the motion of chain 64 to that of chain 47 is in proportion to the cosine of the angle in which the infeed head 36 is moved. This feature of the invention allows the height adjustment to be made while the machine is running as it keeps the flights 66 and 84 in perfect adjustment and synchronization at all times.

As the flights 66 start to retract while they are urging a loaf of bread through the blades 29, they slow down somewhat relative to the speed of the chains 64. In addition, the flights 84 which move at variable speeds because chains 79 are driven by a variable speed drive, are moving at their slowest velocity while urging a loaf through the blades 29. As each loaf clears the blades 29, the flights 84 are speeding up so that the average overall velocity of the loaves passing along the delivery table 76 is greater. This higher speed has a considerable advantage in that it delivers the sliced loaves more rapidly to the wrapper.

Referring now to FIGS. 2 and 6, the forward portion of the infeed head which is shown in FIG. 6 may be pivoted upward about the axis of shaft 55 so that the machine may be more easily cleaned. A shaft bearing support plug 200 and a pivot boss 201 extend into and are rotatably held by an outer portion 202 of the infeed head which is slidably mounted in the manner which has been described. Stop means are provided to hold the infeed head in a horizontal position when it is pivoted back downward after cleaning the machine. A stop suitable for this purpose is shown in FIG. 2. A bracket 350 is secured to frame 20. Mounted in an internally threaded aperture in bracket 350 is a threaded rod stop element 352, having a knob 354 at one end by means of which the position of its opposite end may be adjusted as necessary to stop the infeed head at any desired horizontal level.

While I have described my invention in the best form known to me, it will nevertheless be understood that this is purely exemplary and that modifications may be made without departing from the spirit and scope of the invention except as it may be more particularly limited in the appended claims wherein I claim:

1. In a bread slicing machine having an infeed table and an infeed head positioned over said infeed table to be adjustably positioned at an angle to said infeed table; chain supported flights on said infeed head to individually urge loaves of bread along said infeed table into the bread slicing machine, a drive chain one run of which extends parallel to the angle of adjustment of said infeed head, transmission means engaging said drive chain and driving said chain supported flights on said infeed head, and drive means for said drive chain, and means whereby said chain supported flights are moved by said transmission means at a velocity relative to said drive chain substantially equal to the cosine of the angle of adjustment of said infeed head.

2. In a bread slicing machine having blades inclined at an angle to the path of bread through the machine, a delivery table, and means to engage each loaf of bread after it has partially passed through said blades and urge each loaf down said delivery table; an infeed table, an infeed head positioned over said infeed table to be adjustably positioned parallel to said blades, chain supported flights on said infeed head to urge each loaf along said infeed table into said blades, a drive chain one run of which extends parallel to the angle of adjustment of said infeed head, transmission means on said infeed head engaging said drive chain and driving the chain supported flights, and drive means for said drive chain and said means to urge each loaf down said delivery table, said chain supported flights moving at a velocity relative to said drive chain equal to the cosine of the angle of adjustment of said infeed head.

3. The combination according to claim 2 with the addition of a variable speed drive means interposed between said drive means and said means to urge each loaf down said delivery table, said variable speed drive means moving said means to engage each loaf of bread at a slower rate of speed while each loaf of bread is passing through said blades.

4. A bread slicing machine comprising, in combination, blades inclined at an angle to the path of bread through the machine, a delivery table, a pair of endless chains, flights supported between said endless chains to engage each loaf of bread after it has partially passed through said blades and urge each loaf of bread down said delivery table, means to urge each loaf of bread into said blades, a variable speed drive means for said parallel endless chains, and drive means for said means to urge each loaf of bread into said blades and for said variable speed drive means, said flights moving each loaf of bread at a slower rate of speed while each loaf is passing through said blades.

5. The combination according to claim 4 wherein said variable speed drive means comprises a first shaft, a second shaft disposed beyond said first shaft, parallel to said first shaft and offset from the axis of said first shaft, a driving arm on said first shaft, and a driven arm on said second shaft slidably engaged by the driving arm on said first shaft.

6. In a bread slicing machine having a frame, blades inclined to the path of bread through the machine, a delivery table, and means to engage each loaf of bread after it has partially passed through said blades and urge each loaf down said delivery table; an infeed table, an infeed head positioned over said infeed table, chain supported flights on said infeed head to urge each loaf along said infeed table into said blades, a drive shaft extending into said infeed head, drive means driving said shaft and said means to urge each loaf down said delivery table, and transmission means in said infeed head engaging said shaft and driving said chain supported flights, means whereby said infeed head is secured to the frame of said bread slicing machine to pivot about the axis of said shaft.

7. In a bread slicing machine having a frame, blades inclined at an angle to the path of bread through the machine, a delivery table and means to engage each loaf of bread after it has partially passed through said blades and urge each loaf down said delivery table, an infeed table, an infeed head attached to said frame over said infeed table to be adjustably positioned parallel to said blades, a front portion of said infeed head, chain supported flights on the front portion of said infeed head to urge each loaf along said delivery table into said blades, a drive chain one run of which extends parallel to the angle of adjustment of said infeed head, a shaft on said infeed head, means engaging said drive chain and driving said shaft, transmission means on said front portion of said infeed head engaging said shaft and driving said chain supported flights, and drive means for said drive chain and said means to urge each loaf down said delivery table whereby said chain supported flights move at a velocity relative to said drive chain substantially equal to the cosine of the angle of adjustment of said infed head, and means whereby said front portion of said infeed head is secured to said infeed head to pivot about the axis of said shaft.

8. A machine having a first station at which a first function is performed on a product, a second station where a second function is to be performed on said product, a channel leading into and through said first station to said second station, for feeding said product to said stations, a device having coacting means for continuously moving said product through said first station and said channel, so that said product passes uninterruptedly through said first station and said channel, said coacting means comprising a first pusher element which pushes said product into said first station, a second pusher element which pushes said product from said first to said second station, together with control means for synchronizing the engagement of said second pusher element with said first pusher element, so that said second pusher element engages said product at said first station before said first pusher element ceases pushing thereat, and means in said device for increasing the speed of said second pusher element through said channel between said first and said second station.

9. A bread loaf slicing machine having slicing blades, a first loaf mover for moving a loaf toward and partially through said blades to start slicing, a second loaf mover for moving said loaf the balance of the distance through said blades to complete said slicing and away from said blades after slicing, common driving means operating to synchronize said movers so that said loaf is driven uninterruptedly through said blades, and loaf height adjusting means connected to said first mover, and responsive to said driving means, for adjusting the position of said first mover for loaves of different height, said height adjusting means operable while said common driving means continues to drive both of said movers, without adversely affecting said synchronization.

References Cited in the file of this patent
UNITED STATES PATENTS

| | | |
|---|---|---|
| 2,293,053 | Ferenci | Aug. 18, 1942 |
| 2,917,157 | Fitzgerald | Dec. 15, 1959 |
| 2,934,119 | Hoppe et al. | Apr. 26, 1960 |